W. S. HARLEY.
MOTORCYCLE WINDSHIELD.
APPLICATION FILED MAR. 29, 1919.
1,360,945.
Patented Nov. 30, 1920.
3 SHEETS—SHEET 2.
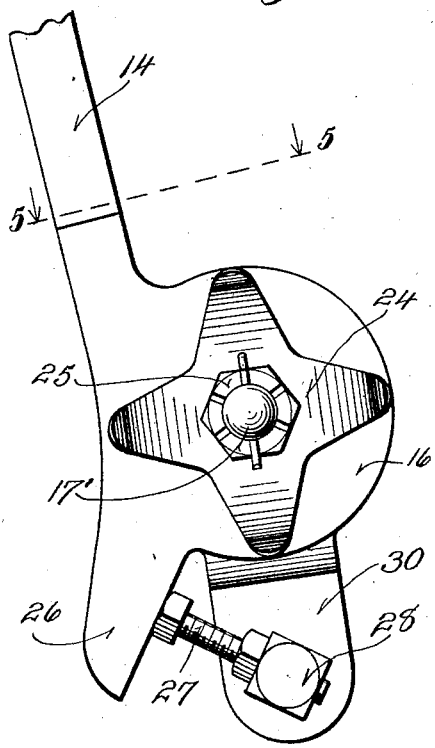
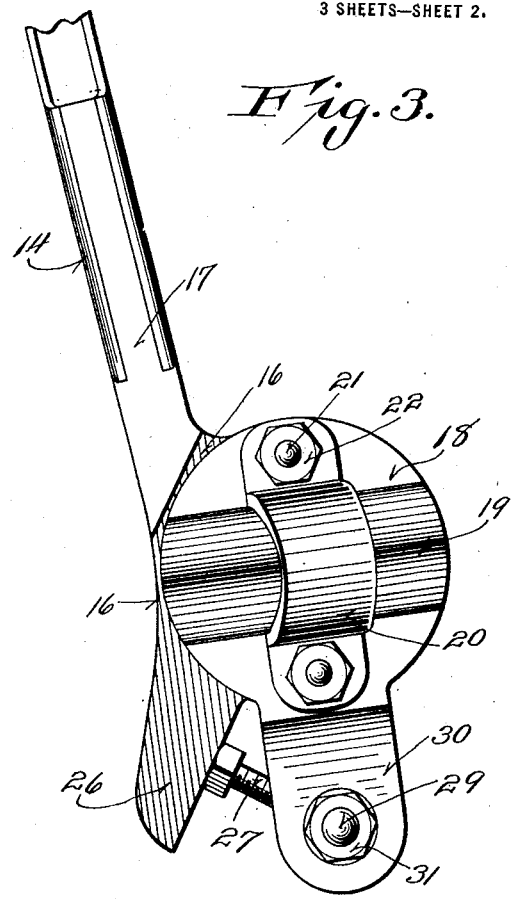
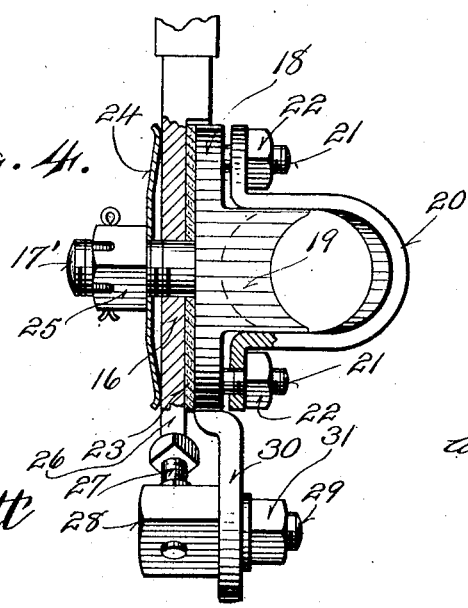
WITNESS
J. P. Britt
INVENTOR
William S. Harley
BY
Young & Young
ATTORNEYS

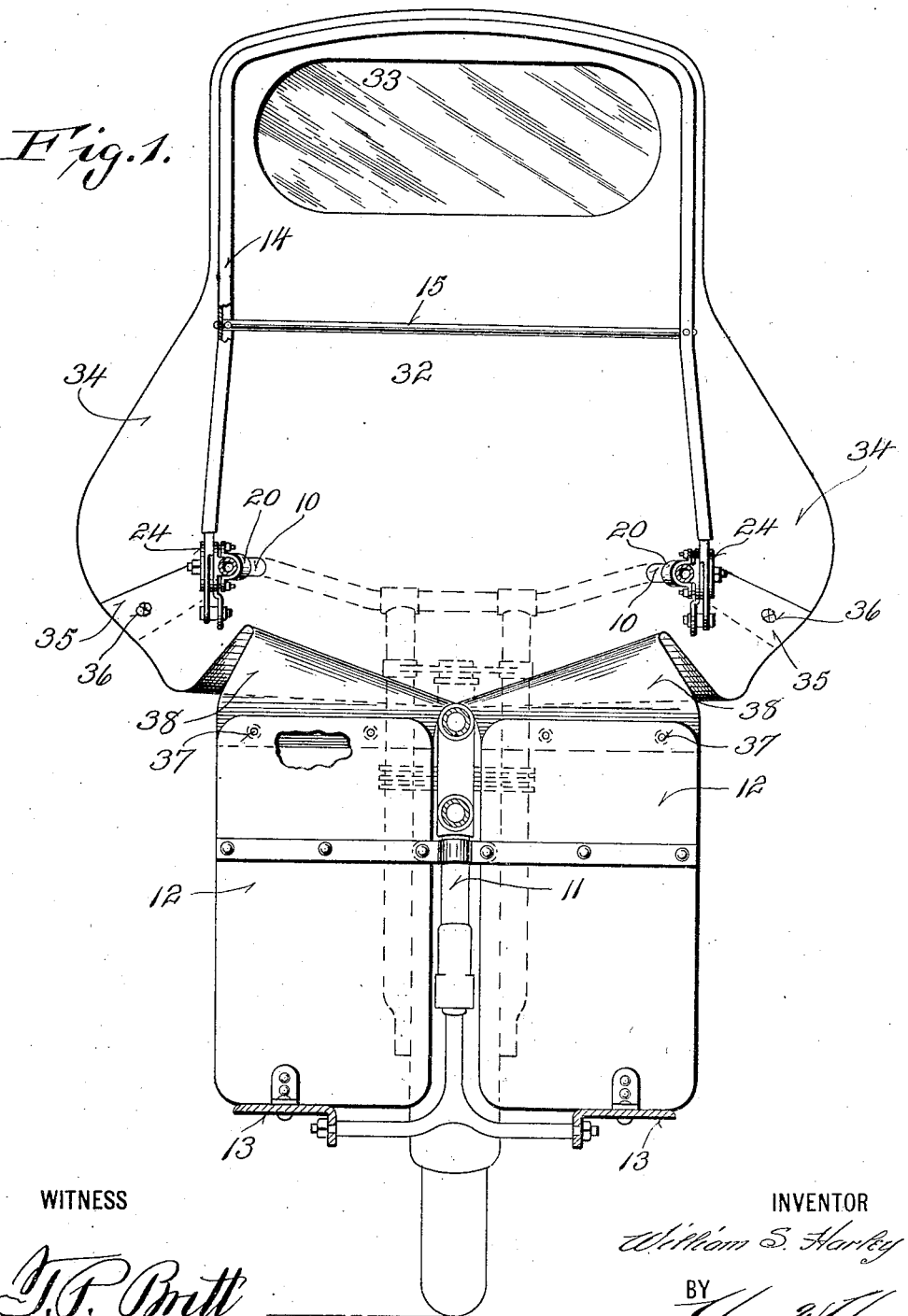

W. S. HARLEY.
MOTORCYCLE WINDSHIELD.
APPLICATION FILED MAR. 29, 1919.

1,360,945.

Patented Nov. 30, 1920.
3 SHEETS—SHEET 3.

WITNESS

INVENTOR
William S. Harley

ATTORNEYS

UNITED STATES PATENT OFFICE.

WILLIAM S. HARLEY, OF MILWAUKEE, WISCONSIN, ASSIGNOR TO HARLEY-DAVIDSON MOTOR CO., OF MILWAUKEE, WISCONSIN.

MOTORCYCLE-WINDSHIELD.

1,360,945.  Specification of Letters Patent.  Patented Nov. 30, 1920.

Application filed March 29, 1919. Serial No. 285,986.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Motorcycle-Windshields; and I do hereby declare that the following is a full, clear, and exact description thereof.

My invention relates to new and useful improvements in windshields, more particularly of that type which is adapted for securement to a motorcycle structure for shielding the body and head of the rider.

It is in general the object of my invention to simplify and otherwise improve the structure and to increase the degree of protection and the convenience afforded by devices of this character.

A further object resides in the provision of a windshield which may be readily attached to a motorcycle handle bar or other support structure and which when attached may be shifted to permit desired freedom of movement of the person whom it is intended to shield.

A still further object resides in the provision of a windshield structure adapted for securement to the handle bar structure of a motorcycle whereby to effect a most snug relation to the rider and wherein provision is made for procuring a complete shielding action without interfering with steering movement of the handle bars.

With the above and other objects and advantages in view, which will be apparent as the description proceeds, my invention resides more particularly in the novel features of construction, combination and arrangement of parts as hereinafter more particularly described and defined by the appended claims.

In the accompanying drawings:

Figure 1 is a rear elevation view of my improved windshield structure applied to the handle bars of a motorcycle, contiguous portions of the motorcycle structure being shown in section.

Fig. 2 is an elevational view of one of the pivot connections of the shield, looking toward the outer side thereof.

Fig. 3 is a similar view looking toward the inner side thereof.

Fig. 4 is an edge view of the connection.

Figure 5:
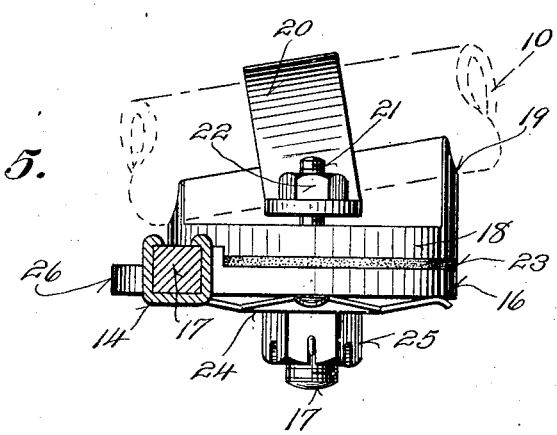
Fig. 5 is a plan view of the connection, the plane of this view being indicated by the line 5—5 of Fig. 2.

Referring now more particularly to the accompanying drawings, 10 designates each of the handle bars of a motorcycle structure and 11 designates the head post of the frame, to which is secured the usual shield plates 12 for protecting the limbs of the rider, these plates being secured at their lower ends to the usual foot rests 13 and having their upper ends spaced a considerable distance below the handle bars.

My improved windshield structure comprises a main frame formed in the present instance of a length of channel iron 14 bent in inverted U-shape, the intermediate portions of the legs of this bar being connected by a brace rod 15 which incidentally affords a convenient handle in grasping the shield to shift it as will be later described. The ends of the channel frame bar 14 have frictional pivotal connection with the handle bars 10, pivotal movement of the frame inwardly being adjustably limited.

To effect this pivotal connection, a friction head disk 16 is secured to each frame leg by a shank 17 secured within the channel of the leg and a pivot bolt 17' is passed through the disk, said bolt being carried on a clamp head 18 having a concaved boss 19 thereon adapted to engage against the handle bar, said boss being embraced by the legs of a U-shaped clamping strap 20 extending about the handle bar and having its ends laterally turned for the reception of bolts 21 extending from the clamping head, nuts 22 being provided on said bolts for drawing the clamping strap to securely fasten the head 18 to the handle bar. It is noted that the concavity of the boss 19 fits the curved surface of the handle bar and inasmuch as the handle bars of a vehicle are relatively inclined, said boss is tapered longitudinally of the handle bar to which it is attached whereby to dispose the pivot axis of the connection in alinement with the pivot axis of the connection for the other handle bar. A friction washer 23 is disposed on the bolt 17' between the friction head 16 and the clamp head 18 and pressure is procured between the contacting faces of the heads and washer by a mushroom spring 24 on the bolt outwardly of the frame head 16, said spring being engaged by a lock nut 25 threaded on the bolt and thus holding all of the parts in assembled relation.

For adjustably limiting pivotal movement of the friction head 16 in one direction, a downwardly extending abutment arm 26 is formed thereon engageable against the head of a stop screw 27 which is threaded in a block 28 having a shank 29 passed through a depending arm 30 on the clamp head, said shank being secured in the arm by a nut 31 threaded thereon.

The body material of the windshield, composed preferably of a single sheet 32 of suitable heavy material is secured to the frame throughout its length in any suitable manner, said body sheet being provided in its upper portion with a sight window 33. The body sheet is flared outwardly at 34 from the lower portion of the frame to form wings adapted to protect the hands and forearms of the rider in grasping the handle bars, and at the lower end of the frame the body material is slit inwardly from its side edges to receive the handle bars, the material at the sides of the slit being lapped as indicated at 35 and connected by a conventional bolt snatch fastener 36 or other suitable connecting means, this lapping of the material procuring an inward inclination of its portion below the handle bars. The bottom of the body sheet is cut on lines converging inwardly toward its center and this bottom edge of the sheet is secured in a straight line to the upper edges of the shield plates 12 by snap fasteners 37 or other suitable securing means, thus affording free folds of material 38 between the shield plates and the handle bars, said folds being taperingly increased in width toward the sides of the sheet, thus permitting free steering movement of the handle bars while at the same time affording a complete protection for the rider.

In certain instances, as in cranking the engine, it is desirable for the rider to lean forwardly of the motorcycle, and a pivotal mounting of the windshield is provided to accommodate this desired freedom of movement, it being noted that the frictional action set up by the spring 24 and washer 23 serves to hold the shield in any desired forwardly tilted position, while inward swinging movement of the shield past a certain predetermined limit is prevented by abutment of the arms 26 of the pivot connections with the adjustable stop screws 27.

Figure 6:
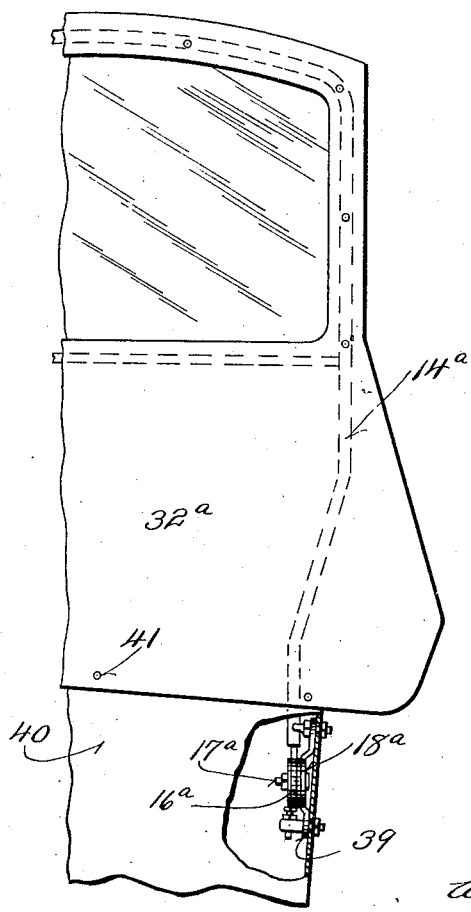
Fig. 6 is a fragmentary front elevational view showing my improved windshield applied to a side-car structure.

My improved windshield may also be associated with a side-car structure as shown in Fig. 6, the forward tilting movement of the shield facilitating entrance and exit of a person with respect to the side car. In this structure, the ends of the frame legs 14$^a$ are inwardly offset and are each secured to a friction head 16$^a$ connected by a bolt 17$^a$ with a stationary friction head 18$^a$ which is secured by lateral arms 39 to the sides of the side-car body 40. The lower end of the body sheet 32$^a$ is secured at 41 in any suitable manner to the side-car body and yields upon tilting movement of the frame.

While I have shown and described the preferred embodiment of my invention, it will be appreciated that, to meet differing conditions of use, various changes and modifications of structure may be employed without departing in any manner from the spirit of my invention.

What is claimed is:

1. A windshield comprising a body member, means for pivotally mounting said body member on a pair of handle bars, means yieldably opposing such pivotal movement, and means for limiting pivotal movement of the body member rearwardly with respect to the handle bars.

2. A windshield comprising a body member, pivotal connections for attaching the body member to a pair of bars, said connections including clamp portions for engagement with the bars and extending obliquely with respect to the pivot axes of the connections, and means for controlling pivotal movement of the body member.

3. A windshield comprising a body member, friction heads carried by the body member, clamping members adapted for securement to a pair of handle bars and pivotally connected with said friction heads, friction members disposed between said friction head and clamping members, means resiliently urging said parts into frictional engagement, and means for limiting pivotal movement of the body member.

4. A windshield comprising a body member, friction heads carried by the body member, clamping members adapted for securement to a pair of bars and pivotally connected with said friction heads, a stop on each clamping member, and an abutment on each friction head engageable with a corresponding stop to limit rearward movement of the windshield body member with respect to the bars.

5. A windshield comprising a body member, friction heads carried by the body member, clamping members adapted for securement to a pair of bars and pivotally connected with said friction heads, abutments on the said friction heads, and stop screws carried by the clamping members and cooperating with said abutments for adjustably limiting rearward movement of the windshield body member with respect to the bars.

6. A windshield comprising a body member, friction heads carried by the body member, a pair of clamping heads, lugs on said heads tapered to correspond to the divergence of a pair of handle bars and engageable therewith, means for clamping the handle bars to said lugs, friction heads on the body member, bolts pivotally connecting said friction heads and clamping heads, and means controlling pivotal movement of the body member.

7. A windshield comprising a frame, means for securing said frame to a pair of handle bars, a body sheet secured to the frame and adapted to extend below the handle bars, and means for securing the lower edge of the body sheet to the motorcycle structure and providing free folds between the handle bars and attaching portion.

8. A windshield comprising a frame, means for securing said frame to a pair of handle bars, a body sheet secured to the frame and adapted to extend below the handle bars, said body sheet being provided with slits extending inwardly from its sides for receiving the handle bars, and means for securing together the body sheet material at the sides of the slits in lapped relation whereby that portion of the body sheet below the handle bars is inclined rearwardly with respect thereto.

9. A windshield comprising a frame, means for securing said frame to a pair of handle bars, a body sheet secured to the frame and adapted to extend below the handle bars, the sides of said body sheet being flared outwardly from the lower portion of the frame to form wings, said body portion being provided with slits extending inwardly from the outer sides of its wing portions for receiving the handle bars, and means for securing together the body sheet material at the sides of the slits in lapped relation whereby that portion of the body sheet below the handle bars is inclined rearwardly with respect thereto.

10. A windshield comprising a frame, means for securing said frame to a pair of handle bars, a body sheet secured to the frame and adapted to extend below the handle bars, the bottom of said body sheet being cut on lines converging inwardly toward its center, and means for securing the bottom of the body sheet in a substantially straight line to the upper edge portions of leg shield plates whereby to afford free folds between the shield plates and handle bars, increasing in width toward the sides of the sheet.

In testimony that I claim the foregoing I have hereunto set my hand at Milwaukee, in the county of Milwaukee and State of Wisconsin.

WILLIAM S. HARLEY.